Patented Mar. 26, 1929.

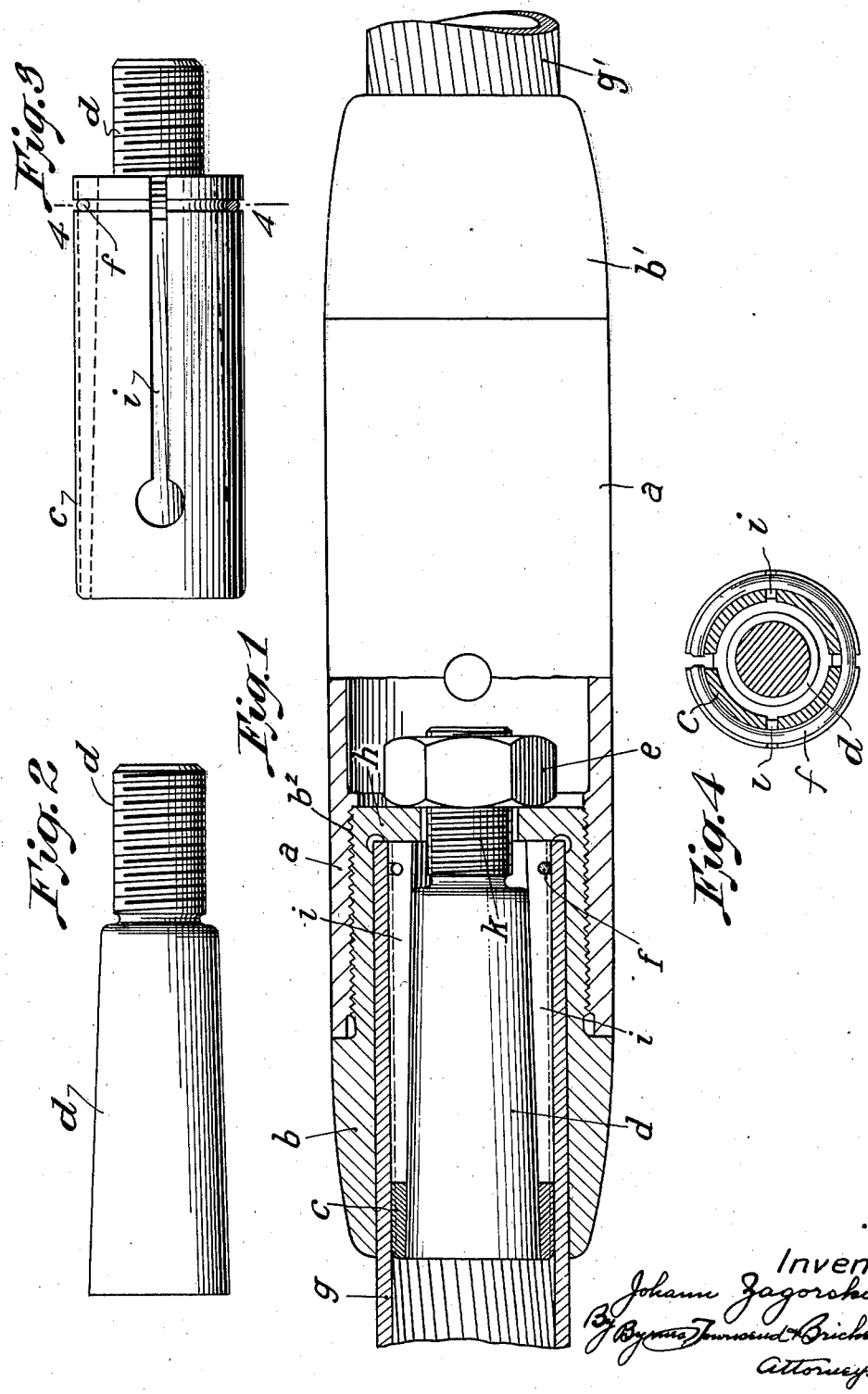

1,706,973

UNITED STATES PATENT OFFICE.

JOHANN ZAGORSKI, OF FRANKFORT-ON-THE-MAIN, GERMANY, ASSIGNOR TO AMERICAN LURGI CORPORATION, OF NEW YORK, N. Y., A CORPORATION OF NEW YORK.

CONNECTER FOR HOLLOW ELECTRICAL CONDUCTORS OR TUBES.

Application filed June 1, 1927, Serial No. 195,751, and in Germany June 2, 1926.

The invention relates to connecters or couplings for hollow electrical conductors such as tubular cables. It is an improvement over known connecters inasmuch as it may have considerably smaller dimensions than previously possible and, also, it presents an entirely smooth and rounded exterior, which is very advantageous with lines subjected to very high voltages since, as is well known, rough and unsuitable surfaces are liable to cause heavy losses of electrical energy by discharge into the air.

The invention has, further, the advantage of great simplicity and solidity, and the connections can be made quickly and readily.

The new connection is effected by conically expanding the ends of the hollow bodies to be connected, which ends are then fixed or retained within a suitably constructed shell by means of correspondingly shaped members inserted into the ends of the hollow conductors.

All parts intended to produce the required pressure on the part of the hollow cable to be fastened are located within or in front of the end of the cable, and no member has a greater diameter than the cable itself except the shell-sleeves which are to be pressed around the ends of the cables to be connected and, if necessary, the nut which fastens the sleeves together.

Fig. 1 shows the connecter secured to two hollow cables, the view being partly in section and partly in elevation;

Fig. 2 is an elevational view of the bolt;

Fig. 3 is an elevational view of the bolt and the expanding sleeve, and

Fig. 4 is a section on line 4—4 of Fig. 3.

In said drawing the letter $a$ represents a nut provided internally with right- and left-hand threads. Sleeves $b$, $b'$ have inwardly extending portions provided with threads corresponding to the internal threads of the nut $a$, $c$ indicates a suitably divided expandible sleeve preferably made in sections and provided with oppositely running slits $i$. A conical expanding bolt $d$ has at one end a threaded part $k$ extending through an opening in the inner end $h$ of the sleeve $b$, so that a nut can be screwed thereon. The ends of the cables to be joined are indicated by the letters $g$, $g'$.

The connection is effected by inserting one of the tapered plugs $d$ and an expanding sleeve $c$ into each cable end to be connected. The cable end is then introduced into the cylindrical bore of a shell-sleeve $b$ and a nut $e$ is screwed upon the threaded bolt $k$ and tightened until the cable end $g$ is securely fastened by the pressure within the sleeve $b$.

Each cable end being mounted in its shell-sleeve, the nut $a$ is run onto both shell-sleeves $b$, $b'$ and tightened. Thus these sleeves and with them the cable ends are joined and tightly held. To avoid discharge into the air, shell-sleeves $b$, $b'$ and nut $a$ are so designed and constructed as to present an uninterrupted smooth surface, as shown.

The slitted portion $i$ of the expanding sleeve $c$ enables the uniform distribution of the pressure upon all parts of the cable ends located inside of the shell-sleeve $b$.

The exterior surface of the expanding sleeve $c$ is preferably roughened whereby there is produced considerable friction between the cable and the sleeve. By the pull on the cable there is produced automatically a tension of the hollow conductor by the spreading sleeve.

To facilitate dismounting, the expanding sleeves $c$ are preferably made in two parts and when being assembled these parts are, as indicated above, held in correct position by the elastic steel-wire ring $f$.

The connecter may of course be used as a terminal clamp. For this purpose one of the shell-sleeves is replaced by a terminal plug which may be screwed into one side of the nut $a$; or a suitably constructed terminal plug may be screwed directly to the thread of one of the shell-sleeves $b$, $b'$ or screwed thereto in any suitable manner.

Instead of a terminal plug, other fastening members may readily be connected with a single cable end mounted according to the present invention. Furthermore, the connecter of the invention may be used for joining more than two hollow cables.

By providing radial shoulders upon the shell sleeve 6 or the tubular member $a$ the connecter may form part of a combined cable connecter and stretching clamp, such a construction being disclosed in my copending application Serial No. 178,093, filed March 24, 1927.

I claim:

1. A connecter for hollow conductors comprising a sleeve to receive within it an end of a conductor, an expandible member for insertion within the conductor, a tapered member for insertion within said expandible member and having a threaded portion adjacent the end of the conductor, and a nut for engagement with said threaded portion and abutting a portion of said sleeve, whereby when the nut is tightened said expandible member is expanded by the movement of said tapered member to press the conductor against said sleeve.

2. A clamp for hollow conductors comprising a sleeve to receive within it an end of a conductor and having an inwardly extending part at one end, an expandible member for insertion within the conductor, a tapered member for insertion within said expandible member and having a threaded portion adjacent the end of the conductor, and a nut for engagement with said threaded portion and abutting said inwardly extending part, whereby when the nut is tightened said expandible member is expanded by the movement of said tapered member to press the conductor against said sleeve.

3. A connecter for hollow conductors comprising a shell sleeve having a bore for receiving a conductor end, and means for radially expanding the end of said conductor into clamping engagement with said sleeve, said means comprising an expandible sleeve within said conductor end and having an outer cylindrical surface conforming to the inner surface of said hollow conductor and having a conical inner surface, and a conical member movable axially of said sleeve for expanding the same, said shell sleeve being substantially coextensive with said expandible sleeve.

4. A connecter for joining the ends of a hollow cable comprising a pair of externally threaded shell sleeves, having bores for receiving the opposed ends of the cables, radially expandible members located within the respective cable ends for clamping said cable ends against the inner surfaces of the respective shell sleeves, and a tubular member having the ends thereof threaded in opposite sense for screwing upon said shell sleeves, to draw the same together.

5. A connecter as set forth in claim 4, wherein the threaded portions of said shell sleeves are of reduced diameter, and the said tubular member has the same diameter as the unthreaded portions of said shell sleeves, whereby the exterior of the connecter presents a smooth unbroken surface.

6. A clamp for attachment to the end of a tubular member, said clamp comprising a shell within which the end of the said member may be inserted, an expandible sleeve having an exterior surface for engagement with the inner wall of said member and having a conical inner surface, a bolt having a conical head for cooperation with the inner conical surface of said sleeve, and means for moving said bolt with respect to said sleeve to expand the same, said means comprising a nut threaded on said bolt and bearing against said sleeve.

7. A clamp for a hollow conductor comprising a slitted sleeve, a conical bolt within said sleeve to exert the pressure, said bolt having an extension and adapted to be inserted with the sleeve into the hollow conductor, a nut threaded on said extension, and a cup-shaped shell-sleeve surrounding the end of the hollow conductor, the threaded extension passing through the bottom of the cup, whereby said slitted sleeve is expanded by the turning of said nut on said extension.

8. A connecter for hollow conductors comprising a sleeve to receive within it an end of a conductor, a slitted sleeve for insertion within the conductor, a tapered bolt for insertion within said slitted sleeve, and a nut on said bolt and engaging said first named sleeve for moving said bolt axially to expand said slitted sleeve.

In testimony whereof, I affix my signature.

JOHANN ZAGORSKI.